United States Patent Office 3,753,982
Patented Aug. 21, 1973

3,753,982
ANTI-BACTERIAL FURYL AND THIENYL
THIAZOLE DERIVATIVES
Patrick Roffey, Camberley, and John Pomfret Verge, Henley-on-Thames, England, assignors to Lilly Industries, Limited, London, England
No Drawing. Filed Dec. 10, 1970, Ser. No. 97,018
Claims priority, application Brazil, Dec. 19, 1969, 215,440, application Great Britain, Apr. 20, 1970, 18,801
Int. Cl. C07d 91/32
U.S. Cl. 260—240 A     10 Claims

ABSTRACT OF THE DISCLOSURE 2-(5-nitro-2-furyl and 2-thienyl)- and 2-[2-(5-nitro-2-furyl and 2-thienyl)vinyl]-4-thiazolyl alcohols and 4-alkanoylthiazole acyl hydrazones possess antibacterial activity and may be prepared by hydrolysis of a corresponding thiazolyl alkyl ester to give the alcohols followed by oxidation and reaction with an acyl hydrazide to yield the hydrazones.

DETAILED DESCRIPTION

According to the present invention there are provided novel thiazole derivatives which are active as antibacterial agents. These novel derivatives are represented by the structural formula:

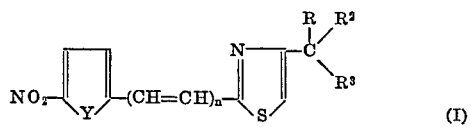

(I)

wherein either $R^2$ is hydrogen and $R^3$ is hydroxyl or $R^2$ and $R^3$ together represent the group;

(II)

Y is oxygen or sulphur, $n$ is 0 or 1, R and $R^1$ are independently hydrogen or $C_{1-4}$ alkyl, and $R^4$ is hydrogen, $C_{1-12}$ alkyl, phenyl, furyl, thienyl, pyrrolyl or phenyl-$(C_{1-4})$alkyl.

The term $C_{1-12}$ alkyl as used herein refers to straight or branched hydrocarbon chains such as methyl, ethyl, n.propyl, isopropyl, n.butyl, isobutyl, s.butyl, t.butyl, n.-amyl, s.amyl, t.amyl, n.hexyl, isohexyl, 3-ethylbutyl, n.-heptyl, t.heptyl, n.octyl, 2-ethylhexyl, n.nonyl, 3-t.butyl-pentyl, n.decyl, n.undecyl, n.dodecyl and the like. Similarly the terms $C_{1-4}$ alkyl and $C_{1-8}$ alkyl mean the foregoing hydrocarbon chains containing up to 4 carbons and up to 8 carbons respectively. The term phenyl ($C_{1-4}$)alkyl as used herein refers to the aforementioned $C_{1-4}$ alkyl groups substituted by a phenyl group such as benzyl, 2-phenethyl, 3-phenopropyl, 4-phenobutyl, 1-phenethyl, 1-phenopropyl, 2-phenobutyl and the like.

Within the group of compounds of Formula I, there is a sub-group having especially powerful antibacterial action, that sub-group comprising compounds wherein Y and $n$ are as defined above (most advantageously Y being oxygen and $n$ being 0), R and $R^1$ are independently hydrogen or methyl and $R^4$ is hydrogen or $C_{1-8}$ alkyl (most advantageously hydrogen or lower alkyl).

Exemplary of compounds falling within the scope of the present invention are:

2-(5-nitro-2-thienyl)-4-formylthiazole formyl hydrazone
2-(5-nitro-2-thienyl)-4-formylthiazole N-acetyl-N-ethyl hydrazone
2-(5-nitro-2-thienyl)-4-formylthiazole n.propionyl hydrazone
2-(5-nitro-2-thienyl)-4-formylthiazole N-isopropionyl-N-methyl hydrazone
2-(5-nitro-2-thienyl)-4-formylthiazole n.butyryl hydrazone
2-(5-nitro-2-thienyl)-4-formylthiazole benzoyl hydrazone
2-(5-nitro-2-thienyl)-4-formylthiazole phenylacetyl hydrazone
2-(5-nitro-2-thienyl)-4-formylthiazole phenylbutyryl hydrazone
2-(5-nitro-2-thienyl)-4-formylthiazole 3'-pyrroyl hydrazone
2-(5-nitro-2-thienyl)-4-formylthiazole 2'-thenoyl hydrazone
2-(5-nitro-2-vinylthienyl)-4-formylthiazole N-acetyl-N-methyl hydrazone
2-(5-nitro-2-vinylthienyl)-4-formylthiazole isopropionyl hydrazone
2-(5-nitro-2-vinylthienyl)-4-formylthiazole s.butyryl hydrazone
2-(5-nitro-2-vinylthienyl)-4-formylthiazole 2'-furoyl hydrazone
2-(5-nitro-2-vinylthienyl)-4-acetylthiazole formyl hydrazone
2-(5-nitro-2-vinylthienyl)-4-acetylthiazole acetyl hydrazone
2-(5-nitro-2-vinylthienyl)-4-acetylthiazole n.propionyl hydrazone
2-(5-nitro-2-vinylthienyl)-4-acetylthiazole phenylacetyl hydrazone
2-(5-nitro-2-thienyl)-4-propionylthiazole acetyl hydrazone
2-(5-nitro-2-thienyl)-4-propionylthiazole n.butyryl hydrazone
2-(5-nitro-2-thienyl)-4-propionylthiazole N-benzoyl-N-methyl hydrazone
2-(5-nitro-2-furyl)-4-acetylthiazole formyl hydrazone
2-(5-nitro-2-furyl)-4-acetylthiazole acetyl hydrazone
2-(5-nitro-2-furyl)-4-propionylthiazole formyl hydrazone
2-(5-nitro-2-furyl)-4-propionylthiazole acetyl hydrazone
2-(5-nitro-2-furyl)-4-butyrylthiazole acetyl hydrazone
2-(5-nitro-2-vinylfuryl)4-acetylthiazole formyl hydrazone
2-(5-nitro-2-vinylfuryl)-4-acetylthiazole N-acetyl-N-methyl hydrazone
2-(5-nitro-2-vinylfuryl)-4-acetylthiazole n.propionyl hydrazone
2-(5-nitro-2-vinylfuryl)-4-acetylthiazole n.hexanoyl hydrazone
2-(5-nitro-2-vinylfuryl)-4-formylthiazole acetyl hydrazone
2-(5-nitro-2-vinylfuryl)-4-formylthiazole isopropionyl hydrazone
2-(5-nitro-2-vinylfuryl)-4-formylthiazole phenylacetyl hydrazone
2-(5-nitro-2-furyl)-4-formylthiazole formyl hydrazone
2-(5-nitro-2-furyl)-4-formylthiazole acetyl hydrazone
2-(5-nitro-2-furyl)-4-formylthiazole N-acetyl-N-methyl hydrazone
2-(5-nitro-2-furyl)-4-formylthiazole n.propionyl hydrazone
2-(5-nitro-2-furyl)-4-formylthiazole isopropionyl hydrazone 2-(5-nitro-2-furyl)-4-formylthiazole n.butyryl hydrazone
2-(5-nitro-2-furyl)-4-formylthiazole n.hexanoyl hydrazone
2-(5-nitro-2-furyl)-4-formylthiazole n.octanoyl hydrazone
2-(5-nitro-2-furyl)-4-formylthiazole benzoyl hydrazone
2-(5-nitro-2-furyl)-4-formylthiazole N-benzoyl-N-ethyl hydrazone
2-(5-nitro-2-furyl)-4-formylthiazole phenylacetyl hydrazone
2-(5-nitro-2-furyl)-4-formylthiazole phenylpropionyl hydrazone
2-(5-nitro-2-furyl)-4-formylthiazole 2'-furoyl hydrazone
2-(5-nitro-2-furyl)-4-formylthiazole 2'-thenoyl hydrazone
2-(5-nitro-2-furyl)-4-formylthiazole 2'-pyrroyl hydrazone
2-(5-nitro-2-furyl)-4-thiazolyl methanol
2-(5-nitro-2-vinylfuryl)-4-thiazolyl methanol
1-[2-(5-nitro-2-furyl)-4-thiazolyl] ethanol
1-[2-(5-nitro-2-furyl)-4-thiazolyl]n.propanol
1-[2-(5-nitro-2-vinylfuryl)-4-thiazolyl] ethanol
1-[2-(5-nitro-2-vinylthienyl)-4-thiazolyl] ethanol
2-(5-nitro-2-vinylthienyl)-4-thiazolyl methanol
2-(5-nitro-2-thienyl)-4-thiazolyl methanol The compounds of Formula I in which $R^2$ is hydrogen and $R^3$ is hydroxyl can be prepared by hydrolysis of the corresponding thiazolyl alkyl ester of formula:

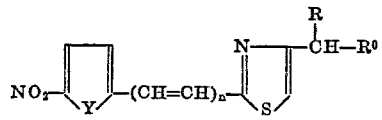

where R, Y and $n$ are as defined above and $R^0$ is the acyloxy residue of a suitable organic carboxylic acid. For convenience in terms of ease of reaction and cost, the carboxylic acid is preferably a lower alkanoic acid, especially acetic acid. Such esters may readily be prepared by reaction of an alkali metal salt, for example the sodium or potassium salt, of the appropriate acid with a compound of the formula:

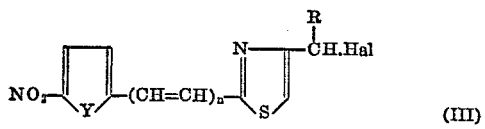

where Hal is a halogen atom, preferably chlorine or bromine, and Y, $n$ and R are as defined above. The esterification reaction is preferably carried out in dimethylformamide at about 70°–95° C. If the halide starting material is chloro or bromo compound, the presence of sodium or potassium iodide in the reaction mixture is useful. The hydrolysis of the resultant ester is preferably carried out in the presence of a mineral acid.

The compounds of Formula I in which $R^2$ and $R^3$ together represent a group of Formula II, may be prepared by reaction of a compound of the formula:

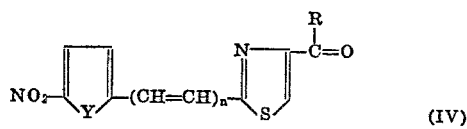

where Y, $n$ and R are as defined above, with either a hydrazide of the formula:

or with a hydrazine of the formula $H_2N—NHR^1$ followed by acylation with an acylating agent containing the group $—COR^4$, $R^1$ and $R^4$ being as defined above.

The compounds of Formula IV may be prepared by a number of different synthetic routes. Thus the 4-formylthiazoles are prepared by the reaction of a 5-nitro-2-furyl(2-thienyl)thiocarboxamide or a 5-nitro-2-vinylthiocarbamyl furan (thiophene) with 1,3-dichloroacetone to obtain the corresponding 4-chloromethylthiazole according to the following equation:

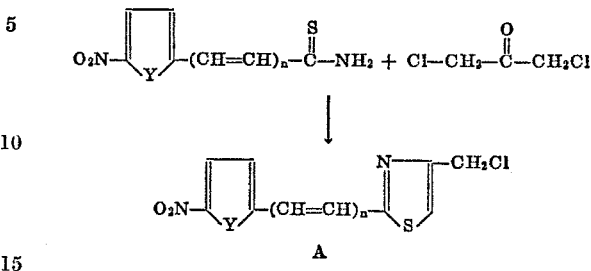

wherein Y and $n$ are as previously defined.

The 4-chloromethylthiazole of the Formula A is reacted with a tertiary amine such as pyridine or hexamethylenetetramine (hexamine) to form the quaternary ammonium methyl thiazole of the Formula B:

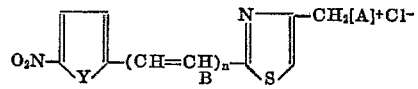

wherein A is pyridinium or hexamethylenetetraminium (hexaminium) and Y and $n$ are as previously defined.

The pyridinium halide of Formula B on reaction with p-nitroso-N,N-dimethylaniline yields an intermediate nitrone which upon hydrolysis as known in the art affords the 4-formylthiazole of Formula IV wherein R is H. The hexaminium halide of Formula B affords the 4-formylthiazole on hydrolysis under acid conditions according to the well-known Sommelet reaction.

The 4-alkanoylthiazole compounds of Formula IV are prepared by the reaction of a 5-nitro-2-furyl (2-thienyl) thiocarboxamide or a 5-nitro-2-vinylthiocarbamylfuran (thiophene) with an α-halo diketone according to the following equation:

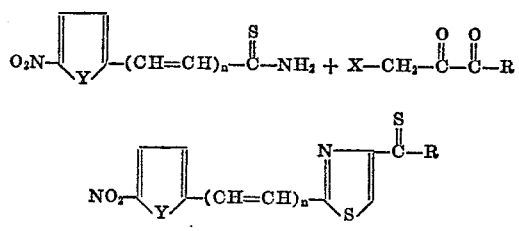

wherein Y, $n$ and R have the same meanings as previously assigned and X is chloro or bromo.

Preferably however the compounds of Formula IV are prepared by oxidation of the alcohols of the present invention, most advantageously using sodium dichromate in glacial acetic acid or another oxidising agent such as chromium trioxide in sulphuric acid or glacial acetic acid.

The compounds of Formula I possess useful anti-bacterial activity, being active against both Gram-positive bacteria such as *Staphylococcus aureus* and *Streptococcus faecalis* and Gram-negative bacteria such as *Aerobacter aerogenes*, *Escherichia coli*, *Klebsiella pneumoniae*, *Proteus morganii*, *Proteus vulgaris* and *Salmonella typhimurium*. Useful activity against *Mycoplasma granularum*, *Mycoplasma gallisepticum*, *Mycoplasma hyorhinis* and *Mycoplasma synoviae* has also been detected. Certain of the compounds of Formula I have also been found to be active against such fungi as *Cryptococcus neoformans*, *Saccharomyces cerevisiae* and *Trichophyton mentagrophytes*.

The following tables show the results of in vitro tests carried out to assess the degree of activity demonstrated by certain compounds of the invention against the various organisms mentioned above. Table I gives the minimum inhibitor concentration (M.I.C.) in microgarm/millilitre (μg./ml.) against certain Gram-positive bacteria; Table II gives the M.I.C. against certain Gram-negative bacteria; Table III gives the M.I.C. against certain fungi; and Table IV gives the M.I.C. against a number of Mycoplasma. The results in Tables I to III were obtained using the gradient plate technique whilst those in Table IV were obtained using the routine tube assay procedure. The code used to indicate the compounds in the tables is as follows:

A = 2-(5-nitro-2-furyl)-4-formylthiazole N-acetyl-N-methylhydrazone
B = 2-(5-nitro-2-furyl)-4-formylthiazole 2'-furoyl hydrazone
C = 2-(5-nitro-2-furyl)-4-formylthiazole n.octanoyl hydrazone
D = 2-(5-nitro-2-furyl)-4-thiazolyl methanol
E = 2-(5-nitro-2-furyl)-4-formylthiazole n.hexanoyl hydrazone
F = 2-(5-nitro-2-furyl)-4-formylthiazole acetyl hydrazone
G = 2-(5-nitro-2-furyl)-4-formylthiazole n.butyryl hydrazone
H = 2-(5-nitro-2-furyl)-4-formylthiazole n.propionyl hydrazone

TABLE I

| Gram-positive bacteria | M.I.C. in, µg./ml. | | | | | | | |
|---|---|---|---|---|---|---|---|---|
| | A | B | C | D | E | F | G | H |
| Staphylococcus aureus | 4.0 | 16 | 64 | 8.0 | 16 | 0.5 | 16 | 2.0 |
| Streptococcus faecalis | 16 | 32 | 128 | 64 | 128 | 1.0 | 64 | 4.0 |

TABLE II

| Gram-negative bacteria | M.I.C. in, µg./ml. | | | |
|---|---|---|---|---|
| | A | D | F | H |
| Aerobacter aerogenes | 8.0 | 16 | 1.0 | 4.0 |
| Escherichia coli | 4.0 | 2.0 | 0.5 | 4.0 |
| Klebsiella pneumoniae | 16 | 4.0 | 1.0 | 4.0 |
| Proteus morganii | >512 | 64 | >512 | >512 |
| Proteus vulgaris | >512 | 64 | >512 | >512 |
| Salmonella typhimurium | 16 | 2.0 | 1.0 | 4.0 |

TABLE III

| Fungi | M.I.C. in, µg./ml. | | |
|---|---|---|---|
| | A | D | F |
| Cryptococcus neoformans | 128 | 32 | 256 |
| Saccharomyces cerevisiae | 256 | 64 | >512 |
| Trichophyton mentagrophytes | 4.0 | 8.0 | 128 |

TABLE IV

| Mycoplasma | M.I.C. in, µg./ml. | |
|---|---|---|
| | D | F |
| Mycoplasma gallisepticum | 6.25 | 1.56 |
| Mycoplasma granularum | 100 | 3.12 |
| Mycoplasma hyorhinis | 3.12 | 1.56 |
| Mycoplasma synoviae | | 1.56 |

From the foregoing results, it will be appreciated that the compounds of this invention possess powerful antimicrobial action and accordingly the present invention also provides a method of treating a bacterial or fungal habitat comprising applying or administering to the habitat an amount of a compound of Formula I sufficient to produce an antibacterial or antifungal effect. For this purpose, the active compounds may be formulated in composition form and accordingly the present invention also provides biologically active compositions comprising at least one compound of Formula I in association with a non-toxic carrier or diluent therefor.

In the treatment of animate habitats, particularly mammals, the active compound in the compositions of the present invention may be enclosed or encapsulated by a carrier in the form of a capsule, sachet, ampoule or other container or mixed or diluted with a suitable diluent. A diluent may be a solid, semi-solid or liquid material which serves as a vehicle, excipient or medium for the active ingredient. Some examples of diluents which may be employed are lactose, dextrose, sucrose, sorbitol, starch, gum acacia, liquid paraffin, oil of theobroma, tragacanth, gelatin, methyl cellulose, methyl hydroxybenzoate, propyl-hydroxybenzoate, microcrystalline cellulose, polyvinylpyrrolidone, white soft paraffin, polyethylene glycol, silica, cetostearyl alcohol, industrial methylated spirits, zinc oxide, sodium lauryl sulphate, glycerin, sorbitan monolaurate, sorbitan trioleate, oleyl alcohol, physiological saline and pyrogen-free water. By mixing or blending the active ingredient with one or more of such diluents, the active ingredient may be formulated in conventional manner into powders, granules, suspensions, pills and tablets for oral use, suppositories for rectal use, injection solutions for parenteral use and tinctures, creams, lotions, ointments and dusting powders for topical use. The latter topical preparations may contain from 0.1 to 25% by weight of active ingredient whilst the dosage unit forms for oral, parenteral or rectal use may contain from 10 to 750 mg., preferably 100 to 500 mg., of active ingredient. In human therapy, such dosage unit forms will normally be administered in such a way as to achieve dosages ranging from 0.1 to 2 g. per day.

In the treatment of inanimate habitats, particularly equipment, furnishings, walls and floors in veterinary, dental and medical offices, surgeries and hospitals, the compositions of the present invention will normally comprise the active ingredient, preferably in amounts of from 0.1 to 25% by weight, dissolved or suspended in an aqueous diluent, advantageously together with a suitable surface active agent. The diluent may itself possess an antibacterial action, for example it may be a commercially available disinfectant preparation with which the compound of Formula I is compatible and upon which it confers greater bactericidal action.

The following examples will illustrate the preparation of a representative group of compounds falling within the scope of the present invention, and the synthesis of intermediates useful in that preparation:

EXAMPLE 1

2-(5-nitro-2-furyl)-4-formyl thiazole 5-nitro-2-thiocarbamyl furan (50 g., 0.3 mole) and 1:3-dichloroacetone (65 g., 0.5 mole) were suspended in dioxan (80 mls.) and heated on a warm water bath for 1½ hours at 70–80° C. under an internal atmosphere of nitrogen. HCl was evolved giving a dark solution. Water (500 ml.) was added to give a solid crystalline product.

Recrystallisation from benzene/60–80° pet. ether gave 51 g. of 2-(5-nitro-2-furyl)-4-chloromethyl thiazole, M.P. 128–30° C.

A solution of the above chloromethyl thiazole (19.3 g., 0.079 mole) and hexamine (14 g., 0.1 mole) in chloroform (150 mls.) was boiled under reflux for 6 hours. The yellow precipitate of the hexaminium salt was collected; washed in chloroform and dried to yield 30.3 g. of the product. It had no sharp melting point.

2 - (5 - nitro - 2 - furyl)-4-thiazolylmethyl hexaminium chloride (30.0 g., 0.078 mole) was dissolved in water (150 mls.) and glacial acetic acid (150 mls.). Hexamine (10 g.) was added and the solution was boiled under reflux for 1½ hours. The solution was evaporated under vacuum to a volume of about 50 mls. and was diluted with water (20 mls.). The pale yellow precipitate was collected and dried, giving 8.0 g. of aldehyde. Recrystallisation from benzene (charcoaling) gave the analytical sample M.P. 178° C.

Found (percent): C, 43.02; H, 1.98; N, 12.54; S, 14.20. $C_8H_4N_2SO_4$ requires (percent): C, 42.85; H, 1.80; N, 12.50; S, 14.30.

The 2:4-dinitrophenyl hydrazone which had M.P. 256–8° C. (decomp) and analysis:

Found (percent): C, 41.89; H, 2.09; N, 20.76; S, 7.85. $C_{14}H_8N_6SO_7$ requires (percent): C, 41.59; H, 1.99; N, 2.79; S, 7.93.

Similarly 2-(5-nitro-2-thienyl)-4-formylthiazole was obtained, M.P. 172° C. after recrystallisation from benzene.

EXAMPLE 2

2-(5'-nitro-2'-vinylthienyl)-4-formylthiazole

A solution of 2-(5'-nitro-2'-vinylthienyl)-4-chloromethyl thiazole (2.86 g., 0.01 mole) and hexamine (2.0 g., 0.13 mole) in chloroform (25 mls.) was stirred and heated under reflux overnight. The resultant precipitate was filtered to give 2-(5'-nitro-2'-vinylthienyl)-4-thiazolylmethyl hexaminium chloride as a yellow solid. Yield 3.7 g. (87%). Recrystallisation from methanol/ether gave a microcrystalline solid melting point 210–215° C. (decomp). The above haxaminium chloride (16.5 g.) and hexamine (4.0 g.) were heated under reflux (1 hour) in 50% acetic acid (125 mls.). The mixture was cooled, poured on to water (100 mls.) containing concentrated hydrochloric acid (25 mls.) and the resultant yellow solid was filtered and dried. Yield 6.0 g. This crude aldehyde was extracted with boiling dioxan (250 mls.), filtered, and the solvent evaporated to give a light yellow crystalline residue, yield 4.1 g. (55%). Recrystallisation from chloroform gave pure 2 - (5' - nitro-2'-vinylthienyl)-4-formyl thiazole, M.P. 208–211° C.

Found (percent): C, 45.30; H, 2.49; N, 10.46; S, 23.97. $C_{10}H_6N_2O_3S_2$ requires (percent): C, 45.15; H, 2.27; N, 10.53; S, 24.11.

Similarly 2-(5-nitro-2-vinylfuryl)-4-formylthiazole was prepared.

EXAMPLE 3

2-(5-nitro-2-thienyl)-4-acetyl thiazole 5-nitro-2-thiocarbamyl thiophene (18.8 g., 0.1 mole) and 1-bromo butan-2,3-dione (20.0 g., 0.02 mole) were dissolved in dioxan (150 mls.) and the solution was stirred and warmed gently to 50–60° C. for 10 minutes. Hydrogen bromide was evolved. The solution was diluted with water (150 mls.) and the dark precipitate was collected, washed with water and dried.

The crude product was extracted with boiling benzene (500 mls.) the hot solution filtered and the filtrate treated with decolourising charcoal. The filtrate was evaporated until crystallisation began, and a small amount of 60–80° pet. ether was added. On cooling, an orange crystalline solid was obtained in a yield of 12.5 g., melting at 198° C.

Found (percent): C, 42.47; H, 2.46; N, 10.84; S, 25.01. $C_9H_6N_2S_2O_3$ requires (percent): C, 45.51; H, 2.38; N, 11.02; S, 25.22.

Similarly 2-(5-nitro-2-vinylfuryl)-4-acetyl thiazole and 2-(5-nitro-2-furyl)-4-acetylthiazole were obtained.

EXAMPLE 4

2-(5-nitro-2-furyl)-4-acetoxymethylthiazole

2 - (5-nitro-2-furyl)-4-chloromethylthiazole (170.7 g., 0.7 mole) and anhydrous sodium acetate (205 g., 2.5 mole) were mixed with dimethyl formamide (700 ml.) and heated with stirring on a steam bath for 3½ hours. During this period, the internal temperature reached 95° C. The reaction mixture was poured into 2½ litres of ice/water slurry and well stirred. The solid precipitate was collected, washed with water and dried. The product was dissolved in 1200 ml. of boiling benzene, filtered and the filtrate treated with charcoal. After re-filtration, the solution was evaporated to dryness, giving 157 g. of 2-(5-nitro-2-furyl)-4-acetoxymethylthiazole M.P. 143° C. after recrystallisation from iso-propanol. Similarly 2-(5-nitro-2-furyl)-4-(1-acetoxyethyl) thiazole, 2-(5-nitro-2-thienyl)-4-acetoxymethylthiazole and 2-(5-nitro-2-vinylfuryl)-4-acetoxymethylthiazole were prepared.

EXAMPLE 5

(a) 2-(5-nitro-2-furyl)-4-thiazolyl methanol

2 - (5-nitro-2-furyl)-4-acetoxymethylthiazole (150 g., 0.56 mole) was dissolved in 700 ml. dioxan and a mixture of 100 ml. concentrated HCl and 100 ml. water was added. The mixture was boiled for 45 minutes and then evaporated to about 150 ml. One litre of cold water was added and shaken to give a solid product which was collected, washed, dried and recrystallised from ethyl acetate/60–80° petroleum ether to yield 2-(5-nitro-2-furyl)-4-thiazolyl methanol, M.P. 152° C.

(b) By the method of (a) above and using the appropriate ester from Example 4 as starting material, 1-[2 - (5 - nitro-2-furyl)-4-thiazolyl]ethanol, 2-(5-nitro-2-thienyl) - 4 - thiazolyl methanol and 2-(5-nitro-2-vinylfuryl)-4-thiazolyl methanol are prepared.

EXAMPLE 6

(a) 2-(5-nitro-2-furyl)-4-formyl thiazole acetyl hydrazone

A solution of 2 - (5-nitro-2-furyl)-4-formyl thiazole (4.48 g., 0.02 mole) and acethydrazide (1.5 g., 0.02 mole) in 80 ml. chloroform was refluxed for 1 hour. The resultant yellow suspension was cooled and a yellow crystalline precipitate was collected and dried. After recrystallisation from peroxide-free dioxan/60–80° petroleum ether mixture there was obtained 3.0 g. of 2-(5-nitro-2-furyl)-4-formyl thiazole acetyl hydrazone, M.P. 216–218° C.

(b) By the method of (a) above but using formic acid hydrazide, there is obtained 2-(5-nitro-2-furyl)-4-formylthiazole formyl hydrazone.

(c) By the method of (a) above but using 2-(5-nitro-2 - thienyl)-4-formylthiazole, 2-(5-nitro-2-vinylfuryl)-4-formylthiazole and 2 - (5-nitro-2-furyl)-4-acetylthiazole, there are obtained the corresponding acetyl hydrazones.

EXAMPLE 7

2-(5-nitro-2-furyl)-4-formyl thiazole propionyl hydrazone 2-(5-nitro-2-furyl)-4-formyl thiazole (4.48 g., 0.02 mole) was dissolved in 125 ml. boiling chloroform and propionic acid hydrazide (2.0 g., 0.022 mole) was added. The mixture was boiled for 3 hours, cooled and the yellow precipitate collected (weight 2.0 g.). The filtrate was evaporated to dryness and the residue combined with the initial precipitate and recrystallised from dioxan/60–80° pet. ether. A second recrystallisation from acetonitrile gave 2.95 g. of the product of M.P. 200° C.

Found (percent): C, 44.79; H, 3.56; N, 18.90; S, 11.06. $C_{11}H_{10}N_4O_4S$ requires (percent): C, 44.89; H, 3.43; N, 19.04; S, 10.90.

(b) By the method of (a) above but using 2-(5-nitro-2-thienyl)-4-formylthiazole, 2 - (5-nitro-2-vinylfuryl)-4-formylthiazole, and 2-(5-nitro-2-furyl)-4-acetylthiazole, there are obtained the corresponding propionyl hydrazones.

EXAMPLE 8

2-(5-nitro-2-furyl)-4-formyl thiazole 2'-furoyl hydrazone

A solution of 2-(5-nitro-2-furyl)-4-formyl thiazole (4.48 g., 0.02 mole) and 2-furoic acid hydrazide (2.6 g., 0.02 mole) in 50 ml. glacial acetic acid was heated on a steam bath for 30 minutes. The suspension thus produced was cooled and yellow crystalline solid collected, washed with water and dried. Yield: 6.0 g., M.P. 263–265° C.

Found (percent): C, 46.86; H, 2.46; N. 16.64; S, 9.95. $C_{13}H_8N_4O_5S$ requires (percent): C, 46.99; H, 2.43; N, 16.86; S, 9.65.

EXAMPLE 9

2-(5-nitro-2-furyl)-4-formyl thiazole n-hexanoyl hydrazone

A solution of 2-(5-nitro-2-furyl)-4-formyl thiazole (4.48 g., 0.02 mole) and n-hexoic acid hydrazide (2.6 g., 0.02 mole) in 50 ml. glacial acetic acid was heated on steam bath for one hour. An equal volume of cold water was added and the mixture cooled. The yellow precipitate was collected, washed with water and dried. After recrystallisation from dioxan/60–80° pet. ether, the product weighed 5.3 g., M.P. 160–161° C.

Found (percent): C, 49.87; H, 4.58; N, 16.54; S, 9.73. $C_{14}H_{16}N_4O_4S$ requires (percent): C, 49.99; H, 4.80; N, 16.66; S, 9.53.

In a similar manner to Example 9 the following analogous hydrazone derivatives were prepared:

EXAMPLE 10 n-Octanoyl hydrazone M.P. 142° C. (from dioxan/60–80° pet. ether)

Found (percent): C, 52.48; H, 5.31; N, 15.18; S, 9.00. $C_{16}H_{20}N_4O_4S$ requires (percent): C, 52.73; H, 5.53; N, 15.38; S, 8.80.

EXAMPLE 11 n-Butyryl hydrazone M.P. 162° C. (from acetonitrile)

Found (percent): C, 46.75; H, 3.84; N, 18.28; S, 10.21. $C_{12}H_{12}N_4O_4S$ requires (percent): C, 46.74; H, 3.92; N, 18.17; S, 10.40.

EXAMPLE 12

Phenylacetyl hydrazone M.P. 168° C. (from acetonitrile)

Found (percent): C, 52.97; H, 3.50; N, 15.53; S, 9.00. $C_{16}H_{12}N_4O_4S$ requires (percent): C, 53.92; H, 3.40; N, 15.72; S, 9.00.

EXAMPLE 13

(a) 2-(5-nitro-2-furyl)-4-formyl thiazole N-acetyl-N-methyl hydrazone

A solution of 2-(5-nitro-2-furyl)-4-formyl thiazole (4.48, 0.02 mole) and methyl hydrazine (1.0 g., 0.02 mole) in chloroform (50 mls.) was boiled under reflux for 30 minutes. The solution was cooled and diluted with 100 mls. ether. A dark red crystalline solid was collected and dried. Yield of methyl hydrazone 3.7 g., M.P. 186° C.

The above product was dissolved in 10 mls. glacial acetic acid and 5 ml. acetic anhydride were added. The solution was heated on a steam bath for 15 minutes and poured into 10 ml. water. The yellow crystalline precipitate was collected, dried and recrystallised from benzene (charcoal). Yield of pure material: 3.57 g., M.P. 176° C.

Found (percent): C, 44.96; H, 3.62; N, 18.82; S, 10.67. $C_{11}H_{10}N_4O_4S$ requires (percent): C, 44.89; H, 3.43; N, 19.04; S, 10.90.

(b) By the method of (a) above but using 2-(5-nitro-2-thienyl)-4-formylthiazole, 2 - (5-nitro-2-vinylfuryl)-4-formylthiazole, and 2-(5-nitro-2-furyl)-4-acetylthiazole, there are obtained the corresponding N-acetyl-N-methyl hydrazones.

We claim:

1. The compound of the formula $$O_2N-\underset{Y}{\underset{|}{\diagdown}}-(CH=CH)_n-\underset{S}{\underset{|}{\diagdown}}-\underset{|}{\overset{R}{C}}=N-\underset{|}{\overset{R_1}{N}}-\overset{O}{\overset{\|}{C}}-R^4$$

wherein Y is oxygen or sulfur, $n$ is 0 or 1, R is hydrogen or $C_1$–$C_4$ alkyl, $R_1$ is hydrogen or $C_1$–$C_4$ alkyl, and $R^4$ is hydrogen, $C_1$–$C_{12}$ alkyl, phenyl, furyl, thienyl, pyrrolyl, or phenyl-$C_1$–$C_4$ alkyl.

2. Compound according to claim 1, wherein $R^4$ is hydrogen, $C_{1-8}$ alkyl, phenyl, furyl or benzyl.

3. Compound according to claim 1, wherein Y is oxygen and $n$ is 0.

4. Compound according to claim 1, wherein R and $R^1$ are independently hydrogen or methyl.

5. Compound according to claim 1, wherein $R^4$ is hydrogen or $C_{1-4}$ alkyl.

6. Compound according to claim 1, said compound being 2-(5-nitro-2-furyl)-4-thiazolyl methanol.

7. Compound according to claim 1, said compound being 2 - (5 - nitro-2-furyl-4-formylthiazole acetyl hydrazone.

8. Compound according to claim 1, said compound being 2-(5-nitro-2-furyl)-4-formylthiazole formyl hydrazone.

9. Compound according to claim 1, said compound being 2-(5-nitro-2-furyl)-4-formylthiazole propionyl hydrazone.

10. Compound according to claim 1, said compound being 2 - (5-nitro-2-furyl)-4-formylthiazole N-acetyl-N-methyl hydrazone.

References Cited

UNITED STATES PATENTS 3,491,091  1/1970  Berger et al. _____ 260—240 A

FOREIGN PATENTS 2,435  8/1965  Japan _____ 260—240 A
1,189,315  4/1970  England _____ 260—240 A JOHN D. RANDOLPH, Primary Examiner U.S. Cl. X.R.

424—270; 260—240.1, 306.8 R